United States Patent
Zhang et al.

(10) Patent No.: US 11,327,734 B2
(45) Date of Patent: May 10, 2022

(54) DOWNLOAD SYSTEM OF APP, DETERMINATION METHOD OF INSTALLATION TYPE AND STORAGE MEDIUM

(71) Applicant: Beijing Digital Union Web Science and Technology Company Limited, Beijing (CN)

(72) Inventors: Yongwei Zhang, Beijing (CN); Congan Yang, Beijing (CN); Yuping Zhang, Beijing (CN)

(73) Assignee: BEIJING DIGITAL UNION WEB SCIENCE AND TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 16/621,574

(22) PCT Filed: Nov. 15, 2019

(86) PCT No.: PCT/CN2019/118625
§ 371 (c)(1),
(2) Date: Dec. 11, 2019

(87) PCT Pub. No.: WO2020/114218
PCT Pub. Date: Jun. 11, 2020

(65) Prior Publication Data
US 2021/0326124 A1 Oct. 21, 2021

(30) Foreign Application Priority Data
Dec. 7, 2018 (CN) .......................... 201811497021.3

(51) Int. Cl.
*G06F 9/44* (2018.01)
*G06F 9/445* (2018.01)
(Continued)

(52) U.S. Cl.
CPC ...................................... *G06F 8/61* (2013.01)

(58) Field of Classification Search
CPC ......................................................... G06F 8/61
See application file for complete search history.

(56) References Cited

U.S. PATENT DOCUMENTS 10,101,984 B1 * 10/2018 Keen ......................... G06F 8/61
2013/0225148 A1 * 8/2013 Ryu ....................... H04W 4/50
455/418
(Continued)

OTHER PUBLICATIONS

Pasquale Salza, Do Developers Update Third-Party Libraries in Mobile Apps?, 2018, pp. 255-264. https://ieeexplore.ieee.org/document/8972993 (Year: 2018).*
(Continued)

*Primary Examiner* — Mongbao Nguyen
(74) *Attorney, Agent, or Firm* — Platinum Intellectual Property LLP

(57) ABSTRACT

This invention provides the download system of APP, determination method of installation type and storage medium. The determination method of the installation types of APP includes: obtaining the installation event of the target APP and the information of the target APP; detecting the device features of the terminal where the target APP is installed and obtaining the application list and application installation history of the terminal, wherein the application list is used to record the information of the application existing in the terminal and the application installation history is used to record the event of installing the APP in the terminal and the information of the installed APP; judging the device type of the terminal according to the device features; using the information of the target APP to match in the application list and application installation history and get the installation status of the target APP in the terminal; determining the installation type of the target APP according to the device
(Continued)

type and installation status. The scheme of this invention can enable the application program to identify the quality of promotion channels.

7 Claims, 4 Drawing Sheets

(51) Int. Cl.
  *G06F 9/455* (2018.01)
  *G06F 8/61* (2018.01)

(56) References Cited

U.S. PATENT DOCUMENTS

| | | | | |
|---|---|---|---|---|
| 2013/0263289 A1* | 10/2013 | Vijayan | ................... | G06F 16/21 |
| | | | | 726/31 |
| 2013/0332518 A1* | 12/2013 | Chor | ....................... | H04L 67/10 |
| | | | | 709/203 |
| 2014/0052683 A1* | 2/2014 | Kirkham | ................. | H04L 67/34 |
| | | | | 706/46 |
| 2014/0123157 A1* | 5/2014 | Keskitalo | ............. | G06Q 10/107 |
| | | | | 719/328 |
| 2014/0188451 A1* | 7/2014 | Asahara | ................ | H04L 41/145 |
| | | | | 703/13 |
| 2014/0282494 A1* | 9/2014 | Chor | ..................... | G06F 16/958 |
| | | | | 717/176 |
| 2015/0163121 A1* | 6/2015 | Mahaffey | ............... | H04W 12/12 |
| | | | | 707/687 |
| 2015/0310485 A1* | 10/2015 | Brown | .................... | G06F 21/50 |
| | | | | 705/14.45 |
| 2016/0066120 A1* | 3/2016 | Lee | .................. | H04M 1/72448 |
| | | | | 455/418 |
| 2017/0134933 A1* | 5/2017 | Padmanabhan | .... | H04N 21/6547 |
| 2017/0171022 A1* | 6/2017 | Hamer | .................... | H04L 43/50 |
| 2019/0026212 A1* | 1/2019 | Verkasalo | ............... | H04L 67/22 |
| 2019/0265958 A1* | 8/2019 | Ayers | ....................... | G06F 21/45 |
| 2020/0034133 A1* | 1/2020 | Dattatri | ..................... | G06F 8/61 |

OTHER PUBLICATIONS

Tae Oh, Android Malware Analysis and Conceptual Malware Mitigation Approaches, 2016, pp. 684-693. https://ieeexplore.ieee.org/stamp/stamp.jsp?tp=&arnumber=7763562 (Year: 2016).*

* cited by examiner

US 11,327,734 B2

DOWNLOAD SYSTEM OF APP, DETERMINATION METHOD OF INSTALLATION TYPE AND STORAGE MEDIUM

TECHNICAL FIELD

This invention relates to Internet technologies, in particular to the download system of APP, determination method of installation type and storage medium.

BACKGROUND ART

With the rapid development of mobile Internet, the number of mobile terminal applications (APPs) has grown explosively, and APPs have covered all aspects of people's life, work and learning. The download of APP, especially for Android system, mainly depends on the third-party mobile application market and other distribution channels.

Using distribution channels to provide APP download and promotion, with the common operation mode: Cost Per Click (CPC). However, the APP developers and distribution channels may dispute the statistical quantity only by CPC. To this end, the existing technology makes statistics as the quantity of APP activated feedback, that is, the APP will send activated feedback after it is installed in the mobile terminal and the statistics will be made as the quantity of activated feedback received.

However, the above statistical methods can't reflect the real installation and utilization of APP and are prone to disputes about fake activation and download amount, which will bring troubles to APP developers and distribution channels.

CONTENTS OF THE INVENTION

One purpose of this invention is to provide a method for determining an APP installation type reflecting the actual installation status of an APP.

One further purpose of this invention is to objectively classify the installation types of the target APP.

The other further purpose of this invention is to improve the accuracy of the classification of the installation types of the target APP.

In particular, this invention provides a method for determining the installation type of an APP, including: obtaining the installation event of the target APP and the information of the target APP; detecting the device features of the terminal where the target APP is installed and obtaining the application list and the application installation history of the terminal, wherein the application list is used to record the information of the application program existing in the terminal and the application installation history is used to record the event of installing the application program in the terminal and the information of the installed APP; judging the device type of the terminal according to the device features; using the information of the target APP to match in the application list and the application installation history to get the installation status of the target APP in the terminal; determining the installation type for the target APP according to the device type and installation status.

Optionally, the installation types of APP include: new, recall, update, repetition, device exception, and simulator installation; and the steps to determine the installation type of the APP based on the device type and installation status include: determining the installation status of the target APP is "new" in the event that the information of the target APP is not recorded in the application list and application installation history; determining the installation status of the target APP is "recall" in the event that the information of the target APP is not recorded in the application list but the information of the target application exists in the application installation history; determining the installation status of the target APP is "update" in the event that the version of the target APP recorded in the application list is different from that in the installation is determined; determining the installation status of the APP is "repetition" in the event that the information of the target APP recorded in the application list is the same as that in the installation; determining that the installation status of the target APP is "device exception" in the event that the device type is exceptional; determining the installation status of the APP is "simulator installation" in the event that the device type is simulator.

Optionally, after determining the installation type of the target APP, it also includes: delivering the installation type of the target APP and the distribution channel of the target APP, so as to make classification and statistics of the download amount of the target APP from the distribution channel.

Optionally, after classification and statistics of the download mount of the target APP from the distribution channel, it also includes: identifying the distribution channel whose device type is exceptional or the proportion of simulator exceeds the set proportion threshold, and marking the distribution channel which exceeds the limit.

Optionally, after classification and statistics of the download mount of the target APP from the distribution channel, it also includes: correcting the download amount of the distribution channel according to the results of the classification and statistics.

Optionally, after determining the installation type of the target APP, it also includes: collecting and saving the device features Optionally, in the event that installation status of the target APP is "new" or "repetition", it includes: using the saved device features to conduct multi-dimensional verification of the device features to confirm the status of "new" or "repetition".

Optionally, the device features include the hardware information of the terminal and the status parameters of the terminal, and the steps of judging the device type of the terminal according to the device features include: judging whether the hardware information are missing and whether the status parameters are beyond the normal value range. If any of the judgment results is yes, then determining the device type is exceptional; using the human-machine identification algorithm model to filter the hardware information and status parameters of the terminal to identify whether the device type is simulator.

According to the other hand of this invention, an APP download system is also provided, including: the distribution channel server, which is used for receiving a download request from the terminal, and providing a target APP which is pre-embedded with a set of instructions for realizing the determination method of the APP installation type above mentioned according to the download request; the terminal, which is used for downloading and installing the target APP, and executing the instruction set when installing the target APP; the statistics server, which is used for obtaining the operation results of the instruction set.

According to the other hand of this invention, a computer-readable storage medium is also provided, which stores the computer programs and is used for realizing the determination method of the APP installation type above mentioned when the computer programs are executed by the CPU.

The determination method for the installation type of the APP of this invention determines the installation of the target APP by obtaining the installation event of the target APP, matches the information of the target APP with the application list and application installation history of the terminal to determine the installation status of the target APP in the terminal, judges the device type of the terminal, and comprehensively considers the installation status and the device type to determine the installation type of the target by considering the device type and installation status, the download and installation of the target APP can be reflected exactly.

Furthermore, the determination method for the installation type of the APP of this invention classifies the installation types of the APP into new, recall, update, repetition, device exception, and simulator installation, which respectively reflects the actual status of the APP, and optimizes the identification and judgment methods of the above types to assure the correctness of the classification.

Furthermore, the determination method for the installation type of the APP of this invention can make classification and statistics of the download amount from the distribution channel through further analysis of the installation type of the target APP, reflect the distribution effect of the APP objectively and justly, avoid the dispute for fake activation and download amount, identify the quality of the promotion channels, filter the ineffective data, put an end to order/amount falsification and other malicious behaviors, reduce the loss from promotion and improve the enthusiasm of APP developers.

In addition, the download system of the APP and the computer-readable storage medium of this invention can be used for realizing the determination method of the APP installation type above mentioned.

According to the details of the embodiments of this invention in the text below and the figures, the technicians of this field will be more aware of the purposes, advantages and features of this invention above mentioned or not mentioned.

BRIEF DESCRIPTION OF THE DRAWINGS

In the text below, certain embodiments of this invention will be specified by examples instead of restrictions with the reference to the figures. The same marks in the figures symbolize the same or similar parts. The technicians of this field shall understand that these figures may not be made as scale. In the figures.

EMBODIMENTS

Figure 1:
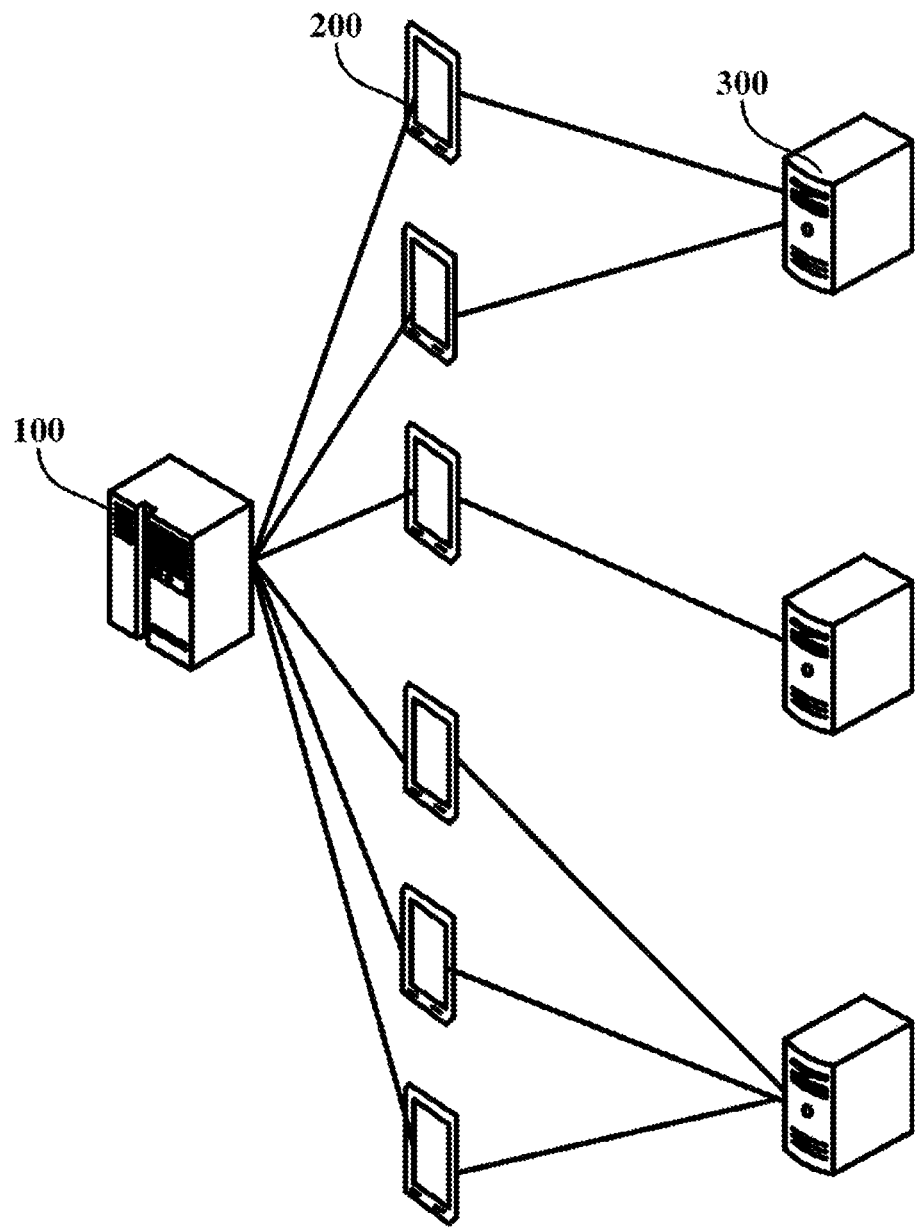
FIG. 1 is the schematic block diagram of the download system of the APP of an embodiment of this invention.

FIG. 1 is the schematic block diagram of the download system of the APP of an embodiment of this invention. The download system of this APP may generally include: distribution channel server 300, terminal 200 and statistical server 100.

The APP developer can provide the APP for the third party who supplies the anti-cheating service after the APP development is completed, pack or process the installation package of the APP, and implant a set of instructions in the target APP (hereinafter referred to as the target APP) that are used to realize the determination method of the APP installation type of this embodiment. The processed target APP will be provided for the distribution channel server 300.

The distribution channel server 300 is used for receiving the download request from the terminal 200 and providing the target APP according to the download request.

The terminal 200 is used for downloading and installing the target APP, and executing the instruction set when installing the target APP to determine the installation type of the target APP. The terminal 200 mentioned in the embodiment can be various mobile terminal devices and portable electronic devices such as smart phones and tablet computers. In particular, the terminal 200 may be an intelligent terminal with an Android operating system. Since the process of downloading the APP by the terminal 200 from distribution channel server 300 is familiar to the technicians of this field, it will not be described in detail in this embodiment. Compared with the download amount or activation amount directly depending on the distribution channel statistics in the existing technology, the download system of the application program in this embodiment is added with a third-party statistics server 100. The statistics server 100 can be used to obtain the operation result of the instruction set, that is, to obtain the installation type of the target APP, and can further make classification and statistics of the download amount of the target APP. The statistical results can more accurately reflect the download and usage of the target APP.

The installation type of the above-mentioned target APP can be further used to analyze the distribution channels, such as marking the distribution channels with excessive exceptions, identifying false terminals, and proposing more just evaluation criteria for promotion effect.

Figure 2:
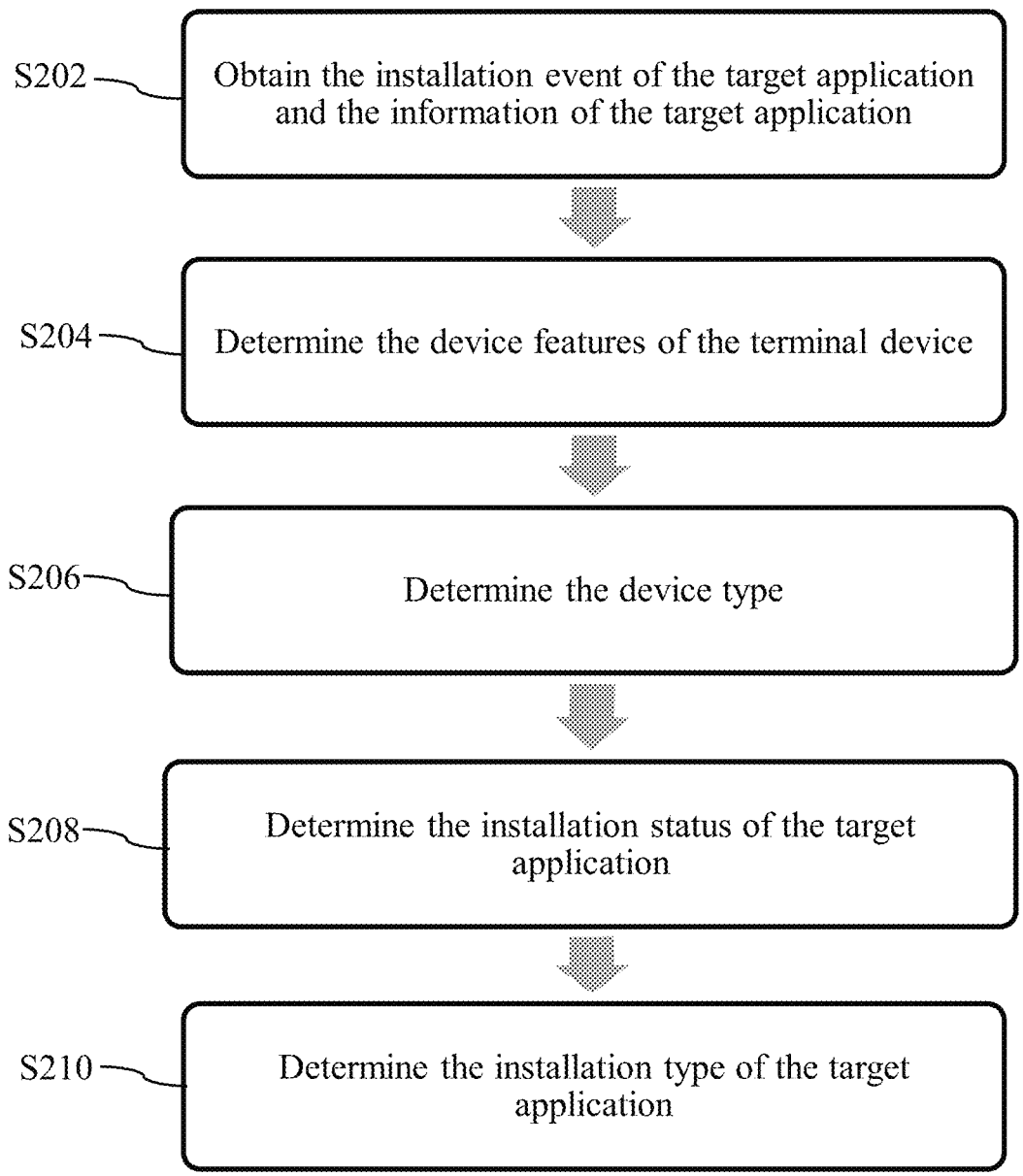
FIG. 2 is the schematic diagram of the determination method of the installation type of the APP of an embodiment of this invention.

FIG. 2 is the schematic diagram of the determination method of the APP installation type of an embodiment. The determination method of the installation type of this APP may generally include:

Step S202: obtaining the installation event of the target APP and the information of the target APP; the installation event can be triggered by the installation process of starting the target APP. That is to say, the determination method of the APP installation type of this embodiment can be started after the installation of the target APP to start the Step 202. The information of the target APP can include the following information without limitation: APP name, package name, icon and version number.

Step S204: detecting the device features of the terminal where the target APP is installed and obtaining the application list and application installation history of the terminal. The application list is used to record the information of the APP existing in the terminal, and the application installation history is used to record the events of installing the APP in the terminal and the information of the installed APP, such as the installation time and usage of the APP.

The device features of the terminal may include the hardware information of the terminal and the status parameters of the terminal, wherein the hardware information may include but not limited to the information of the CPU, the information of the network system and the information of the built-in memory. Thereof, the CPU information can include: CPU architecture, instruction set support, running frequency and manufacturer. The network system information can include the network system that the mobile terminal can support, such as GSM, GPRS, EDGE, CDMA, WCDMA, TD-SCDMA, CDMA2000, HSDPA, HSUPA, LTE-TDD, LTE-FDD and TD-LTE. The built-in memory information can include manufacturers, storage capacity, and read-write performance. The contents of the above hardware information are all described by examples. In some practical use processes, the specific contents of the hardware information can be added or reduced.

The status parameters of the terminal can include the sensing results of various sensing devices, including but not limited to position parameters, temperature parameters, electricity parameters and space attitude parameters.

Step S206: judging the device type of the terminal according to the device features. This step can specifically include: judging whether the hardware information are missing and whether the status parameters are beyond the normal value range. If any of the judgment results is yes, determining the device type is exceptional; using the human-computer identification algorithm model to filter the hardware information and status parameters of the terminal to identify whether the device type is simulator.

For example, the judgment process for terminal device features may include but not limited to: querying the above hardware information in the pre-collected device hardware information base; judging whether the acquired device features are consistent with the configuration of the pre-collected terminal of the same signal; judging whether the above device features are consistent with the device features of the pre-set simulator; and judging whether the core component's hardware information is missing; confirming that the above device type is normal or simulator.

For instance, the above-mentioned status parameters can be compared with the reasonable value range of parameters. If the status parameters exceed the normal value range, such as sudden change of position parameters, constant electric quantity, temperature exceeding the normal ambient temperature range, the device can be considered as exceptional.

Step S208: using the information of the target APP to match in the application list and application installation history to get the installation status of the target APP in the terminal.

Step S210: determining the installation type of the target APP based on the device type and installation status. In this embodiment, for the specific use scene of the APP, six installation types, i.e. new, recall, update, repetition, device exception, and simulator installation have been made.

The determination basis of the above six installation status includes: In the event that the information of the target application isn't recorded in the application list and the application installation history, it is determined that the installation status of the target APP is "new"; the new status refers to the first time that the target APP is installed in a normal terminal.

In the event that the information of the target APP is not recorded in the application list but the information of the target APP exists in the application installation history, it is determined that the installation status of the target APP is "recall". The status of recall refers to that the target APP has been installed in the terminal, and this installation belongs to the reinstallation after uninstallation.

In the event that the version of the target APP recorded in the application list is different from that in the installation, it is determined that the installation status of the target APP is "update". The status of update refers to the version update of the target APP.

In the event that the information of the target APP recorded in the application list is the same as that in the installation, it is determined that the installation status of the application is "repetition", that is, the target APP is repeatedly installed.

In the event that the device type is exceptional, it is determined that the installation status of the target APP is "device exception", that is, the target APP is installed in a false or suspect terminal.

In the event that the device type is simulator, it is determined that the installation status of the target APP is the "simulator installation", that is, the target APP is installed in the simulator. After determining the installation type of the target APP, it also includes: delivering the installation type of the target APP and the distribution channel of the target APP, so as to make classification and statistics of the download amount of the target APP from the distribution channel. Compared with the existing technology which only makes statistics of the download amount or activation amount, the method in this embodiment makes classification and statistics, so that the installation status of the target APP can be learnt exactly.

The results of the above classification and statistics can be used for further analysis, such as marking the distribution channels with excessive exceptions, identifying false terminals, and proposing more fair evaluation criteria for promotion effect.

When marking the distribution channels with excessive exceptions, we may identify the distribution channels from which the device type is exceptional or the proportion of simulator exceeds the set proportion threshold, and mark the distribution channels that exceed the limit. Due to the excessive number of exceptional terminals installed in such distribution channels, there is a suspicion of false promotion. We can strictly limit or check these distribution channels, identify the quality of promotion channels, filter invalid data, and put an end to malicious behavior such as order/amount falsification.

When a more fair evaluation criteria of promotion effect is proposed, the download amount from distribution channels shall be modified according to the results of classification and statistics. For example, different types of installation may be given corresponding weights such as less weight in new, recall, update and repetition and exclusion of device exception and simulator installation from the installation amount. It can provide a more just evaluation criteria of promotion effect and meet the interests of APP developers and distribution channels.

The device features of the terminal where the target APP is installed and collected in Step S204 can also be uploaded and saved so as to verify the installation type of the above-mentioned target APP. For example, in the event that the installation status of the target APP is determined to be "new" or "repetition", multi-dimensional verification of the device features can also be performed by using the saved device features so as to confirm the status of "new" or "repetition". The above-mentioned multi-dimensional verification can use multiple device features of the terminal for comprehensive judgment, such as IMEI (International Mobile Equipment Identity), Bluetooth device address, MEID (mobile equipment identifier) and SN (Serial number) of the terminal to confirm the terminal is unique and further confirm the status of "new" or "repetition".

Figure 3:
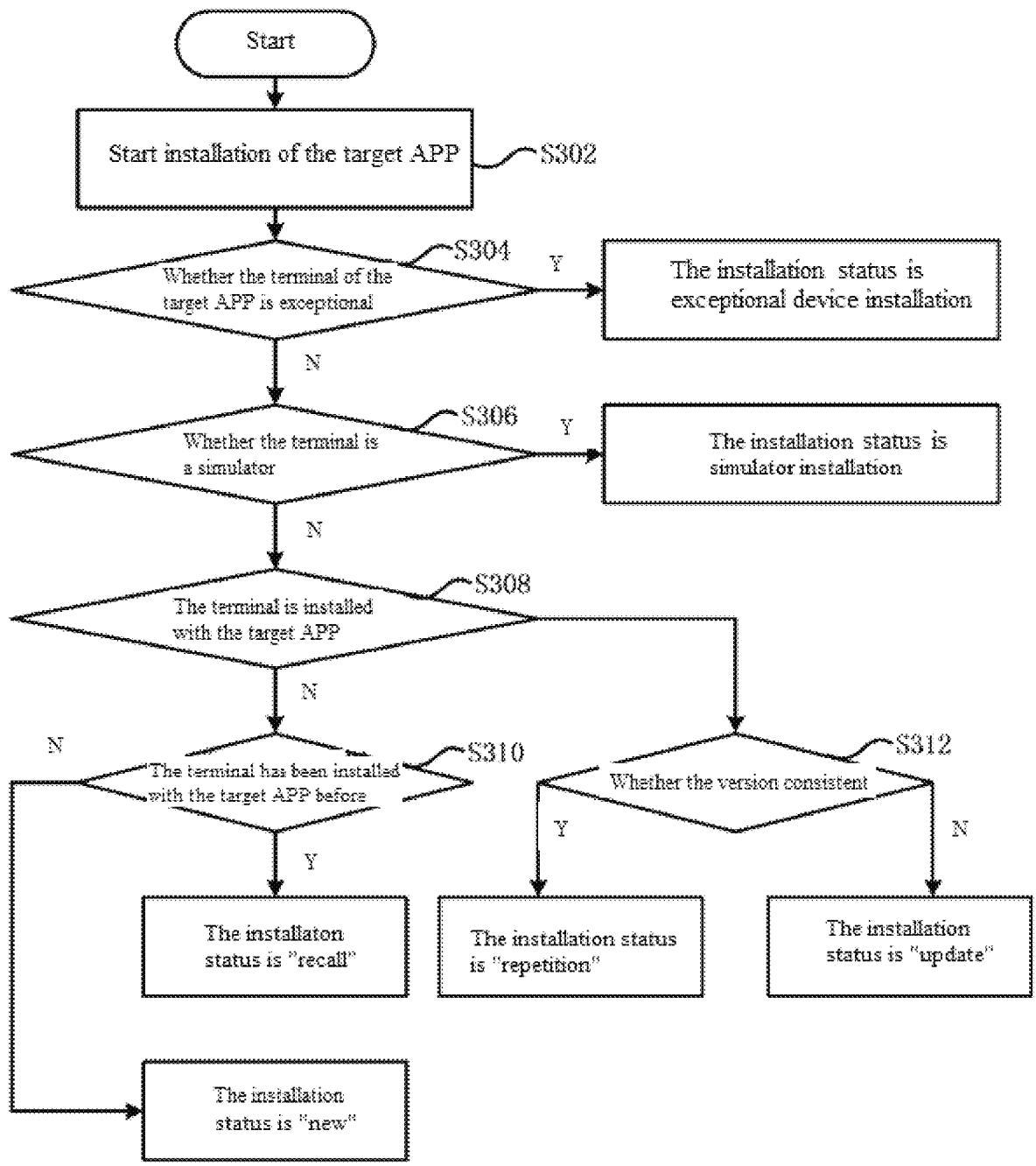
FIG. 3 is the flow chart of the determination method of the APP installation type of an embodiment of this invention.

FIG. 3 is the flow chart of the determination method of the APP installation type of an embodiment and it may include:

Step S302: starting installation of the target APP.

Step S304: identifying whether the terminal where the target APP is installed is exceptional; if yes (e.g. loss of core hardware information and obvious over-limit of status parameters), determining the installation status of the target APP is device exception.

Step S306: identifying whether the terminal where the target APP is installed is simulator; if yes, determining whether the installation status of the target APP is simulator installation.

Step S308: judging whether the terminal is installed with the target APP.

Step S310: if the terminal isn't installed with the target APP at present, judge whether it has been installed with the target APP; if yes, confirm the installation status of the target APP is "recall"; if no, confirm the installation status of the target APP is "new".

Step S312, if the terminal isn't installed with the target APP at present, judge whether the installation version of the terminal is consistent with the target APP; if yes, confirm the installation status of the target APP is "repetition"; if not, judge the installation status of the target APP is "update".

Figure 4:
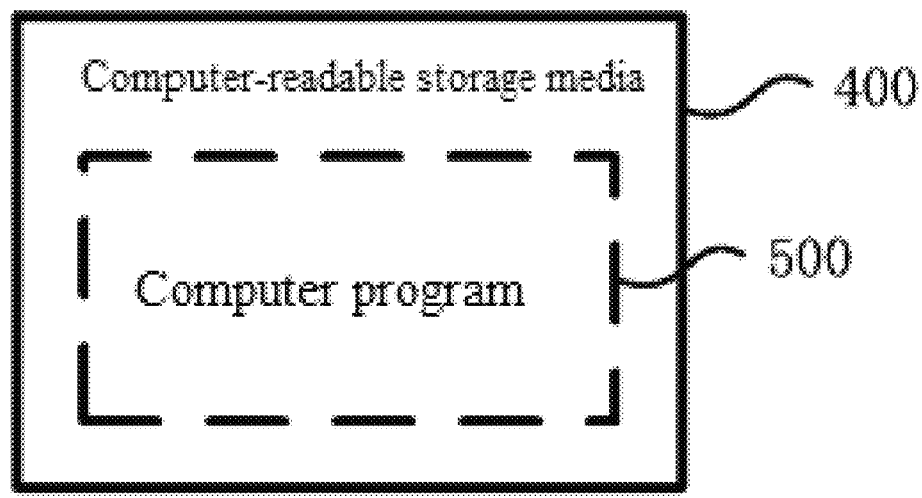
FIG. 4 is a schematic diagram of computer-readable storage medium of an embodiment of this invention.

The embodiment also provides a computer-readable storage medium 400, and FIG. 4 is the schematic diagram of the computer-readable storage medium 400 of an embodiment of this invention. The computer-readable storage medium 400 has the computer program 500 which can realize the determination method of the above-mentioned APP installation type when executed by CPU. The computer-readable storage medium 400 may be a tangible device that can hold and store instructions used by the instruction execution device. The computer-readable storage medium 400 may be, for example, but is not limited to, electric storage device, magnetic storage device, optical storage device, electromagnetic storage device, semiconductor storage device, or any suitable combination of the above-mentioned. The specific examples (non-exhaustive lists) of computer-readable storage media include: portable computer disk, hard disk, random access memory (RAM), read-only memory (ROM), erasable programmable read-only memory (EPROM or flash memory), static random access memory (SRAM), portable compressed disk read-only memory (CD-ROM), digital versatile disk (DVD), memory stick, and any suitable combination of the above-mentioned.

The computer-readable program instructions described in this embodiment may be downloaded from the computer-readable storage medium 400 to various computing/processing devices, or to an external computer or external storage device through such networks as the Internet, LAN, WAN and/or WIFI.

The determination method of the APP installation type in this embodiment is to install the target APP by obtaining the installation event of the target APP, match the information of the target APP with the application list and the application installation history of the terminal to determine the installation status of the target APP in the terminal, judge the device type of the terminal and comprehensively consider the installation status as well as the device type to determine the installation type of the target APP. As the device type and installation status are considered, the download and installation of the target APP may be reflected exactly.

Furthermore, the determination method of APP installation type in this embodiment classifies the application installation types into new, recall, update, repetition, device exception, and simulator installation which respectively reflect the actual status of the application, and optimizes the identification & determination method of the above types, assuring the correctness of classification, reflecting the distribution effect of the APP objectively and justly, avoiding the dispute of fake activation and download amount, identifying the quality of promotion channels, filtering invalid data, putting an end to malicious behaviors such as order/amount falsification, reducing the loss during promotion and improving the enthusiasm of APP developers.

The technicians of this field shall understand that though this paper has elaborated multiple demonstrative embodiments, many variations or changes complied with the invention principles can also be directly determined or inferred according to the disclosed contents of this invention based on the spirit and scope of this invention. Therefore, the scope of this invention shall be understood and recognized as it has covered all these variations or changes.

We claim:

1. A computer-implemented method of evaluating distribution channels for a target application, including:

receiving, by a statistical server from a plurality of terminal devices, installation information of the target application related to a distribution channel;

receiving, by the statistical server from each individual terminal device, device features of the terminal device that has installed the target application and receiving an application list and an application installation history of the terminal device, wherein the application list indicates the present installed applications in the terminal device, and the application installation history indicates the application installation history in the terminal device, wherein the device features comprise hardware information and status parameters of the terminal device;

determining a device type of the terminal device according to the device features, wherein the device type is one of a normal device, an exceptional device and a simulator device;

determining, for each individual terminal device, an installation status of the target application based on the application list and the application installation history, wherein the installation status is one of a new installation, a recall installation, a update installation, a repetition installation;

determining an installation type of the target application based on the device type of the terminal device and the installation status of the target application, wherein the installation type is one of a new installation, a recall installation, an update installation, a repetition installation, an exceptional installation and a simulator installation; and determining a statistical reliability of the distribution channel based on the individual installation type of the target application and a total download number of the target application associated with the distribution channel;

wherein the determining the installation status of the application is the recall installation in the event that the information of the application is not recorded in the application list but the information of the target application exists in the application installation history;

wherein determining the installation status of the application is the update installation in the event that the version of the application recorded in the application list is different from that in the installation is determined;

wherein determining the installation status of the application is repetition in the event that the information of the application recorded in the application list is the same as that in the installation;

wherein determining that the installation status of the application is the exceptional installation in the event that the device type is exceptional; and wherein determining the installation status of the application is the simulator installation in the event that the device type is simulator.

2. The computer-implemented method of claim 1, further comprising:

determining a number of the exceptional devices and/or simulator devices associated with the distribution channel exceeds a predetermined threshold; and marking the distribution channel as a false channel.

3. The computer-implemented method of claim 1, further comprising:

correcting a total download amount of the distribution channel based on the statistical reliability of the distribution channel.

4. The computer-implemented method of claim 1, further comprising:

collecting and saving the device features of the terminal device.

5. The computer-implemented method of claim 4, further comprising:

determining the installation status is one of the new installation or the repetition installation; and conducting a multi-dimensional verification of the terminal device based on the saved device features to further confirm the installation status.

6. The computer-implemented method of claim 1, further comprising:

determining the device type is an exceptional device based on abnormal device features.

7. The computer-implemented method of claim 1, further comprising:

determining the device type is a simulator device based on an identification algorithm model.

\* \* \* \* \*